June 18, 1968  P. C. GEBHARD  3,388,936
JOINT FASTENING FOR STORM DOORS, STORM WINDOWS, AND
SIMILAR STRUCTURES
Filed Jan. 27, 1966  5 Sheets-Sheet 1

INVENTOR.
PAUL C. GEBHARD
BY
Mandeville & Schweitzer
ATTORNEYS

June 18, 1968 P. C. GEBHARD 3,388,936
JOINT FASTENING FOR STORM DOORS, STORM WINDOWS, AND
SIMILAR STRUCTURES
Filed Jan. 27, 1966 5 Sheets-Sheet 2

INVENTOR.
PAUL C. GEBHARD
BY
Mandeville & Schweitzer
ATTORNEYS

June 18, 1968  P. C. GEBHARD  3,388,936
JOINT FASTENING FOR STORM DOORS, STORM WINDOWS, AND
SIMILAR STRUCTURES
Filed Jan. 27, 1966  5 Sheets-Sheet 3

INVENTOR.
PAUL C. GEBHARD
BY
Mandeville & Schweitzer
ATTORNEYS

June 18, 1968 P. C. GEBHARD 3,388,936
JOINT FASTENING FOR STORM DOORS, STORM WINDOWS, AND
SIMILAR STRUCTURES
Filed Jan. 27, 1966 5 Sheets-Sheet 4

INVENTOR.
PAUL C. GEBHARD
BY
Mandeville & Schweitzer
ATTORNEYS

INVENTOR.
PAUL C. GEBHARD
BY
Mandeville & Schweitzer
ATTORNEYS

United States Patent Office 3,388,936
Patented June 18, 1968

3,388,936
JOINT FASTENING FOR STORM DOORS, STORM WINDOWS, AND SIMILAR STRUCTURES
Paul C. Gebhard, 2426 Westlake Ave., Oceanside, N.Y. 11572
Filed Jan. 27, 1966, Ser. No. 523,405
17 Claims. (Cl. 287—189.36)

ABSTRACT OF THE DISCLOSURE

A corner fastening assembly for mitered joints. The assembly includes compression and tension elements that respond to forces applied to an actuating element to accurately align the edges of the joint. Outwardly acting pressure means, also responding to the forces applied to the actuating element, for aligning the front and back sections of the framing sections is also provided by the invention.

---

The present invention relates to a joint fastening for storm doors, storm windows, and similar structures, and is most advantageously applied to the secure fastening and alignment of framing sections or rails of such structures at mitered corners and other joints. The device and structure of the present invention incorporates the principles of my prior United States Patent No. 2,994,414 and includes certain significant improvement features imparting greater efficiency and effectiveness in the utilization of the corner fastening and providing for desired economies in its manufacture.

Basically, the corner fastening device of my prior Patent No. 2,994,414 comprises a tension element which engages a pair of butted frame sections and spans the mitered corner joint between them. A second element, acting more or less in compression, spans the mitered joint and engages the butted frame sections in a manner to maintain the sections in desired alignment and to apply compressive forces across the joint of the butted frame sections. An adjusting screw extends between the tension and compression elements and can be manipulated to cause the butted frame sections to be drawn tightly together. The structure of my prior patent is characterized by simplicity of assembly, extraordinary effectiveness of the clamping and securing action on the butted frame sections, and by an ability to retighten the mitered joint at a later time, if necessary, to accommodate creep or other deformations in the frame section material.

In accordance with one aspect of the present invention, a novel and improved joint fastening arrangement is provided which incorporates the basic principles of my prior Patent No. 2,994,414, and which may be manufactured on an extremely economical basis and distributed to points of utilization with minimum cost and inconvenience. To this end, the novel and improved corner fastening assembly of the present invention incorporates two principal securing elements, designated for convenience of reference as tension and compression elements, respectively, which may be mass produced at extremely low cost, as by stamping or otherwise forming from sheet metal or other suitable stock. Further, in accordance with the invention, the tension and compression elements of the new corner fastening assembly are so designed and constructed as to enable the use, as an actuating and adjusting element, of a conventional stove bolt and nut or the like, which may be readily procured from conventional distribution sources at advantageous prices. The entire corner fastening assembly, consisting of stamped-out tension and compression members and a conventional stove bolt and nut or the like, is simplified, lightweight, extremely economical and yet, as will be described hereinafter, extraordinarily effective in the securing of butted frame rail elements in the manner desired.

In accordance with another significant aspect of the invention, a novel and improved corner fastening assembly is provided, of the type and having the characteristics mentioned above, in which the principal tension and compression elements of the fastening assembly serve not only to draw the butted frame rails into tightly fitting relation at the mitered joint, but additionally to precisely align the butted frame sections not only in the direction of the miter axis but at right angles to the plane of the frame sections themselves. In this respect, the tension and compression elements of the new corner fastening assembly include portions disposed in spanning relation to the butted joint which tend to be deformed by the application of tension and compression, respectively, to the assembly components in such manner as to bear outward against the inner wall surfaces of the frame rail sections, serving to align the rail sections against being offset or skewed relative to the principal plane or planes defined by the joined rails.

With respect to the above, the typical frame sections to be joined by the corner fastening assembly of the invention are of hollow, extruded construction, and the entire corner fastening assembly is arranged to be received internally of the rails, in spanning relation to the butted joint, which is typically a mitered corner joint. When the corner fastening device so received is actuated, the respective tension and compression elements act principally to draw the connected frame sections closer together to compress them at the butted joint. In addition, however, and in accordance with significant aspects of the invention, the application of such forces to the tension and compression elements serves to deform the elements, advantageously by resilient or elastic deformation, in a direction outward against the principal front and rear surfaces of the frame sections, on both sides of the butted joint. Forces applied to the frame sections by such resilient deformation precisely align the joined frame section, so that a highly smooth and flush joint is formed.

In accordance with a further and more specific aspect of the invention, the corner fastening assembly as described in the preceding paragraph is so arranged that the outwardly deformable portions of the tension and compression elements are spaced substantially from each other along the axis of the butted joint. The arrangement is such that, in the fully tightened joint, the frame sections are not only tightly held together in compression along the axis of the joint, but are additionally firmly supported at spaced points along the miter axis against twisting or skewing. As will be appreciated, this auxiliary feature is of particular importance in connection with the construction of storm doors and screen doors, for example, which may be subjected to severe wrenching and twisting forces in normal use.

As will be described in more detail hereinafter, the corner fastening assembly of the invention may assume a variety of specific forms, all of which are characterized by relative economy of manuafacture and installation and/or particularly effective and advantageous fastening or securing action. Accordingly, for a better understanding of the invention and a further explanation of its features and advantages, reference should be made to the following detailed description and to the accompanying drawing, in which:

Referring now to the drawing, and initially to FIGS. 1–6 thereof, the reference numeral 10 designates in a general way a storm or screen door of conventional construction, including a plurality of frame rails or frame sections 11–14, with one or more mullions 15. Although the corner fastening assembly of the present invention has other applications, as will be readily appreciated and understood after consideration of the following description, a typical, advantageous, and particularly desirable use of the assembly is in connection with storm doors and screen doors, storm and screen windows, etc., wherein the principal frame sections, mullions, and other structural components are of hollow, extruded construction. Currently, extruded aluminum sections are widely used, and the specific description contained herein is directed to such extruded sections. However, rolled steel and other frame sections are used in many applications, and the corner fastening assembly of the invention is equally applicable to those and other types of window, door, and other structures.

Figure 1:
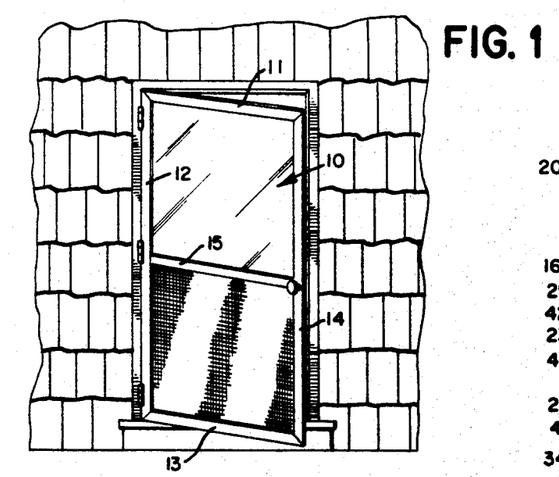
FIG. 1 is a front elevational view of a storm or screen door of typical external construction, comprising a plurality of connected frame sections.
Figure 2:
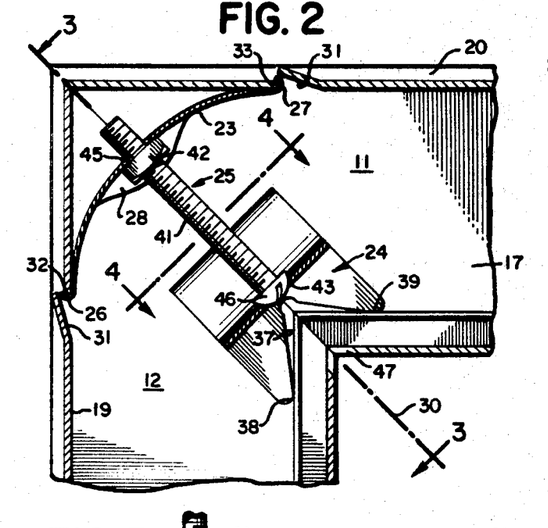
FIG. 2 is an enlarged, cross-sectional view, as taken generally along line 2—2 of FIG. 3, showing details of one advantageous form of corner fastening assembly according to the invention.

In a typical storm door corner assembly, as illustrated in FIG. 2, the frame sections (sections 11, 12 being illustrated) include front and rear walls 16, 17 (FIG. 3) and inner and outer walls 18, 19. Depending on the particular strength and use requirements, the frame sections may also include various ribs and flanges and, in the structure of FIGS. 1–6, the frame rails include external flanges 20, an internal flange 21, and interior ribs 22, it being understood that the specific extruded or otherwise formed cross-section does not, in itself, constitute a significant aspect of the invention.

In forming a typical corner structure, a pair of frame sections, as sections 11, 12 of FIG. 2, are mitered at 45° and arranged to be brought into butted relationship. It is the function of the corner fastening assembly of the invention to secure the frame sections in such butted relationship tightly and in accurate alignment. In the form of the invention illustrated in FIGS. 2–6, the corner fastening device comprises a tension element, generally designated by the numeral 23, a compression element generally designated by the numeral 24, and an adjusting or actuating element generally designated by the numeral 25. The tension element 23 advantageously comprises a straplike section or length of sheet metal, desirably spring temper stainless steel, which is provided at each end with outwardly curved portions forming hooks 26, 27 and is provided in its central region with opposed, spaced pressure tabs 28, 29, which project downward and away from the opposed lateral edges of the tension strap.

At predetermined points spaced outward from the miter axis 30 of the butted corner joint, the outer walls 19 of the respective frame sections are provided with punched out openings 31 forming wall edges 32, 33 facing away from the miter axis. A small tab of the outer wall material is bent outward adjacent each of the wall edges 32, 33, as shown in FIG. 2, such that the hook portions 26, 26 at the ends of the tension strap 23 may be readily inserted in the openings 31 and engaged with the outwardly facing wall edges 32, 33.

The compression element 24 of the corner fastening assembly of the invention, likewise, advantageously is formed of a sheet metal material, such as spring temper stainless steel and is shaped to provide a pair of pressure legs 34, 35, having inverted V-shaped notches 36, 37 therein, advantageously of an included angle less than 90° whereby to be able to bear with localized force upon portions of the respective butted frame sections spaced outward from the miter axis, substantially as indicated at 38, 39 of FIG. 2. In the illustration of FIGS. 2–6, the pressure legs 34, 35 are arranged to bear upon the interior ribs 22.

Figure 5:
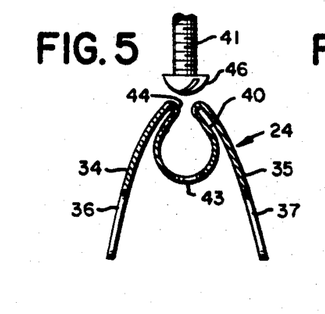
FIGS. 5 and 6 are cross-sectional representations of a compression element incorporated in the corner fastening assembly of FIG. 2, illustrating the manner of assembling therewith an actuating or adjusting bolt.
Figure 6:
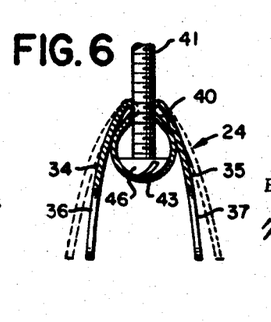

As shown in FIGS. 2, 5, and 6, the compression element of the invention advantageously is formed of a sheet metal material such as 19 gauge 302 stainless steel, and is shaped to provide, from one end to the other of a strip section, a first pressure leg 34 extending upward and inward (as viewed in FIG. 5), a central troughlike portion 40 having a generally U-shaped cross-section, and a second pressure leg portion 35 extending downward and outward. Overall, the compression element 24 has a cross-sectional configuration similar to the letter M.

As reflected in FIGS. 3–6, the configuration of the compression element 24 advantageously is such that the initial spread or separation of the extremities of the pressure legs 34, 35 is somewhat in excess of the internal separation of the front and rear walls 16, 17 of the frame sections. Accordingly, in order to install the compression element 24 in position in a mitered joint, as illustrated in FIG. 2, it is necessary first to press the pressure legs 34, 35 toward each other, to bring them from the initial condition illustrated in FIG. 5, to the resiliently compressed condition illustrated in FIG. 6. The lateral pressure tabs 28, 29 of the tension strap 23 may initially be so shaped and disposed as to be slightly narrower than the interior dimensions of the frame sections 11, 12, the tabs advantageously being of curved configuration so as to enable them to be easily inserted into the installed position, substantially as reflected in FIG. 3, for example.

In accordance with the basic teachings of my prior Patent No. 2,994,414, the tension and compression elements 23, 24 are caused to exert their primary securing functions by means of the actuating member 25, which acts between the tension and compression elements and is adjustable to place one under tension and the other under compression. In accordance with one of the specific and advantageous aspects of the invention, the new corner fastening assembly is so designed and constructed that the actuating member 25 may be in the form of a conventional stove bolt and nut 41, 42. The bolt 41 has a conventional rounded head 46, which is supported and cradled in the rounded, troughlike central portion 40 of the compression member 24, as illustrated in FIG. 6, a suitable access opening 43 of smaller diameter than the bolthead 46 being provided in the troughlike portion 40 to afford screwdriver access to the bolthead for actuating adjustment. In addition, the compression member 24 advantageously is provided with a pair of grooves or openings 44 (FIG. 5) of an arcuate contour arranged to receive and support the shank portion of the actuating bolt 41, substantially as illustrated in FIG. 6. The arrangement advantageously is such that the bolt 41 is supported, at least to some extent, in predetermined alignment with the compression element by means of the troughlike central portion 40, the opening 43 therein, and the arcuate grooves 44.

As shown in FIG. 2, the length of the bolt 41 is such, in relation to the internal width dimensions of the frame sections 11, 12, that the end of the bolt extends through and somewhat beyond the tension element 23, being received in an opening 45 in the central portion thereof. A conventional square nut 42 applied over the threads of the stove bolt 41 is disposed just inside of the tension strap 23, bearing against the inside surface thereof and being confined generally between the lateral pressure tabs 28, 29. Advantageously, the bolt 41 is disposed substantially along the miter axis of the butted frame sections 11, 12 and is symmetrically related to both the tension and compression elements 23, 24.

Figure 3:
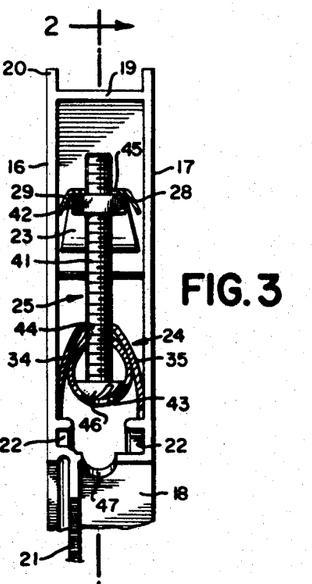
FIG. 3 is a cross-sectional view taken generally along line 3—3 of FIG. 2.

In accordance with a specific aspect of the invention, the relationship of the lateral pressure tabs 28, 29 to the dimensions of the nut 42 advantageously is such that, with the nut received closely against the inside surface of the tension element 23, the nut is prevented from turning relative to the tension element by the tabs 28, 29, substantially as shown in FIG. 3. Accordingly, in the installed condition of the corner fastening assembly, actuating adjustment may be made by simply inserting a screwdriver or like tool through an opening 47 in the inside corner of the angle joint formed by the frame sections 11, 12 and engaging the head of the stove bolt 41. The stove bolt may be turned in a direction to urge the bolthead away from the nut, the nut being held against rotation by the pressure tabs 28, 29 of the tension element 23, simultaneously placing the tension element 23 under desired tension and the compression element 24 under desired compression.

In the utilization of the corner fastening assembly of FIGS. 2–6, the frame sections 11, 12 are initially mitered or otherwise prepared to form a butted joint, usually by cutting along a 45° axis, and small openings 31 are formed in the outer wall 19 of the respective rails to receive the tension element hook portions 26, 27. The fastener elements 23, 24, and 25 are then assembled in a preliminary way by inserting the bolthead portion in the trough 40 of the compression element, in the manner indicated in FIGS. 5 and 6, and inserting the free end of the bolt through the opening 45 in the tension strap. The tension and compression elements are then inserted in and engaged with one of the frame rail sections 11 or 12, the tabs 28, 29 or pressure legs 34, 35 being manually compressed if necessary to effect the initial insertion. Thereafter, the second frame section is applied over the partly installed fastener assembly and brought into butted relation with the first-mentioned frame section.

Preliminary to the above-described assembly operations, the stove bolt and nut 42 are so preadjusted that the hook portions 26, 27 can be snapped into place in the openings 31 upon the frame sections 11 and 12 being brought into butted relationship, it being understood that in the final phases of the assembly operation the fastener elements 23–25 desirably are completely concealed and inaccessible within the interior of the frame sections, except for the access provided to the bolthead 46, through the openings 47, 43 of the frame rails and the compression member, respectively.

After preliminary assembly of the frame rails 11, 12 and the fastener parts 23–25, substantially in the configuration of FIG. 2 but loosely assembled, the bolthead 46 is engaged by a screwdriver and rotated in an appropriate direction (counterclockwise if the bolt and nut are of conventional righthand thread) simultaneously urging the compression member 24 in an inward direction and the center of the tension strap 23 in an outward direction. As the parts are brought into a tensioned or compressioned condition, aligning and securing forces are applied to the frame sections in a number of ways and at a number of points, as outlined below.

As the tension element 23 is placed under tension, and thereby brought into a bowed configuration, as indicated in FIG. 2, force is applied to the respective frame sections 11, 12 through the hook portions 26, 27, drawing the frame sections into tightly butted relation as a function of the amount of tension in the element 23. In addition, because tension is applied to the element 23 by means of the nut 42 tending to move outward along the miter axis and thereby tending to bring the tension element 23 into arced or bowed configuration, the lateral pressure tabs 28, 29, which span the miter axis 30, as shown in FIG. 2, tend to return to the principal surface contour of the center portion of the tension element. As viewed in FIG. 3, for example, the pressure tabs 28, 29 would tend to pivot upward and outward. This upward and outward movement of the tabs causes them to bear outward against the butted front and rear walls 16, 17 of the frame sections 11, 12, so that these walls are precisely aligned for improved joint appearance and securely held in such alignment for significantly increased joint strength against twisting and displacing movement of one frame section relative to the other.

Advantageously, the compression element 24 is so proportioned that, with the bolt 41 inserted therein as shown in FIG. 6, the initial separation of the pressure legs 34, 35 at their extremities is somewhat greater than the internal thickness of the frame sections 11, 12 so that some additional manual compression of the legs 34, 35 toward each other is necessary to install the compression member 24 into the first frame section. Accordingly, the opposed pressure legs 34, 35 initially bear outward against the opposed front and rear walls 16, 17 of the frame sections, spanning the miter axis, to impart an initial alignment to the respective frame sections along or adjacent to the "inside" corner of the joint.

Figure 4:
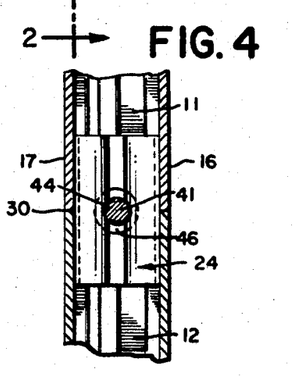
FIG. 4 is a cross-sectional view of the fastening of FIG. 2, taken generally along line 4—4 thereof.

When the actuating bolt 41 is manipulated to place the compression element 24 under compression, the pressure points 38, 39 of each pressure leg act against the frame ribs 22, serving to align one frame section relative to the other along the miter axis 30 and to compress the frame sections tightly together at the inside corner, all as set forth in my prior United States Patent No. 2,994,414. In addition, in the improved corner fastening assembly of the present invention, the inwardly directed compression forces applied by the actuating bolt 41 to the compression member 24 serve to urge the pressure legs 34, 35 to separate, so that the respective legs are urged with increasing force outward against the front and rear walls 16, 17 of the frame sections 11, 12, in spanning relation to the miter axis 30. Accordingly, with increasing force as the actuating bolt 41 is "tightened" the inside corner areas of the butted frame sections 11, 12 are urged into flush relationship, substantially as shown in FIG. 4, and are urged to maintain such relationship by the continued outward forces of the pressure legs 34, 35.

Thus, as will be understood, the improved corner fastening assembly of the present invention, in addition to serving to draw the inside and outside corners of the butted frame sections 11, 12 into tight, butting relationship with substantially greater force, effectiveness, and reliability than with conventional corner fasteners, functions to press strongly outward against the front and rear walls of the frame sections, in spanning relation to the miter axis, at points spaced from each other and located adjacent the inside and outside corner of the joined sections. The lateral forces of the pressure tabs 28, 29 and of the outwardly acting pressure legs 34, 35 strongly resist any twisting or skewing of the joined frame sections 11, 12, as will be understood, which imparts significant desirable strength and stability to the joint.

With respect to lateral alignment and support of the frame sections against twisting, it should be borne in mind that the frame sections 11, 12 with which the corner fastening assembly of the invention is commonly utilized are of extruded aluminum formation, which is subject to significant tolerance variations from piece to piece, taking into consideration that individual lengths to be joined together may be produced by different dies, with different extrusion machines, from different metal billets, etc., all of which may give rise to slight variations in the critical internal dimensions. Accordingly, the past practice of seeking to secure relative alignment of joined frame sections by spanning the miter joint with a solid, non-resilient metal section has proved less than adequate over the years, because the solid corner fastening element must necessarily be dimensioned to accommodate the frame section with the smallest internal dimensions tolerated by the production practices of a given manufacturer. And this is aggravated by the fact that a rail on the low tolerance range may be joined with a rail on the high end of the tolerance range. With the corner fastening assembly of the invention, however, the relatively resilient and forcefully urged lateral pressure tabs 28, 29 and pressure legs 34, 35 readily accommodate resonable variations in dimension tolerances and still function to press forcefully outward against the front and rear walls of joined frame rail sections to impart precise alignment to the joint and to significantly strengthen it against twisting and other distorting forces.

Figures 7, 8, 9, 10:
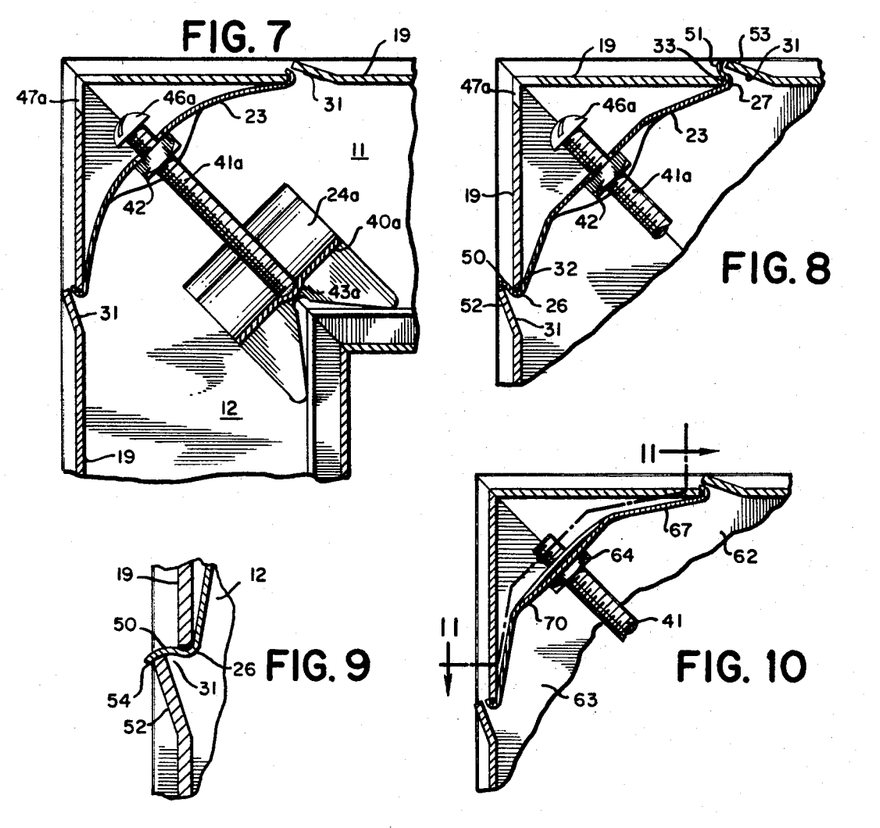
FIG. 7 is a cross-sectional view, similar to FIG. 2, showing a first modified form of corner joint fastening assembly according to the invention, illustrating the fastening assembly in a condition after being tightened down to secure the joint.
FIG. 8 is a fragmentary, cross-sectional view similar to FIG. 7, showing a further modified form of the new corner fastening assembly, in a condition prior to tightening of the joint.
FIG. 9 is an enlarged, fragmentary, cross-sectional view of the corner fastening assembly of FIG. 8, illustrating an advantageous interlock action between the ends of the tension element and the outer walls of the frame sections.
FIG. 10 is a cross-sectional view generally similar to FIG. 2, illustrating a further modified form of corner fastening assembly, particularly adapted for frame sections of unusual thickness, which incorporates a tension element having cut sections for non-rotatively gripping an actuating nut.

In the modified form of the invention shown in FIG. 7, the frame sections 11, 12 are substantially the same as shown in FIG. 2, except that an opening 47a for screwdriver access is provided at the outer corner of the butted frame sections, instead of at the inner corner, as illustrated in FIG. 2. The tension element 23 may be identical to that illustrated in FIG. 2, and the actuating bolt 41a may be identical to that illustrated in FIG. 2, except that it is oriented with its slotted head 46a exposed toward the outside corner of the joined frame sections, accessible through the opening 47a. The compression element 24a of the FIG. 7 modification may be identical in its essential functions to the compression element 24 of the FIG. 2 illustration, except that a socket 43a may be provided in the trough portion 40a of the FIG. 7 modification, instead of the opening 43 of the FIG. 2 modification.

In the assembly of the corner fastener of FIG. 7, the end of the bolt 41a is supported by the socket 43a of the compression element 24a, and the joint is "tightened" by actuating the bolt 41a to draw the nut 42 toward the bolthead instead of away from it as in the FIG. 2 modification.

The modification of FIGS. 8 and 9 is shown to be identical in most respects to the modification of FIG. 7, except that the tension element 23 is provided at its ends with primary hook portions 26, 27, as in the FIG. 2 modification, and with secondary or reverse hooks 50, 51. In forming the frame section openings 31, tab sections 52, 53 are punched slightly out of the planes of the outer walls 19 of the frame sections to provide free wall edges 54 (FIG. 9) directed in opposed relation to the principal hooking edges 32, 33 of the walls 19.

During the initial, loose installation of the corner fastening assembly of FIGS. 8 and 9, the secondary or return hooks 50, 51 are readily received through the openings 31 in the frame rail 19. Thereafter, as the joint is tightened down by appropriate (typically, clockwise) rotation of the bolt 41a, the primary hook portions 26, 27 of the tension element 23 will tighten down against the frame section walls 19. Depending upon the relative size and strength of the sheet or strip material used in the formation of the tension element 23, it might otherwise be possible by excessive tightening of the bolt 41a to overstress the primary hooks 26, 27 and tend to cause them to spring out of engagement with the wall edges 32, 33. In the modification of FIGS. 8 and 9, however, any initial tendency for this to occur through excessive tightening of the bolt 41a causes the secondary or reverse hooks 50, 51 to be brought into engagement with the projecting edges 54 of the tabs 52, 53, preventing the primary hooks 26, 27 from being further distorted to the extent necessary to release themselves from the principally engaged wall edges 32, 33.

Figure 11:
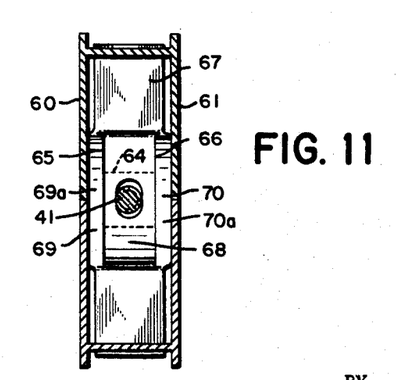
FIG. 11 is a cross-sectional view taken generally along line 11—11 of FIG. 10.

The modification of FIGS. 10 and 11 is particularly suited for applications in which the internal front-to-back dimension between the front and rear walls 60, 61 of frame sections 62, 63 is substantially in excess of the width dimension of a standard stove bolt nut 64. In such cases, it may be desirable to form spaced slits 65, 66 in the center portion of the tension strap 67, defining a central strip portion 68 approximately of the width of the nut 64 and outer strips 69, 70 of sufficient width to span the distance between the sides of the nut 64 and the internal walls of the frame sections 62, 63. Advantageously, the outer strips 69, 70 may be provided with inwardly curved portions 69a, 70a, forming lateral pressure tabs corresponding somewhat in function to the tabs 28, 29 of the modification of FIGS. 2–6.

In the initial formation of the tension element 67, the central strip 68 is advantageously offset at least slightly from the outer strips 69, 70, so that the nut 64 may be initially received between the edges of the strip sections 69, 70 substantially as illustrated in FIG. 10. This arrangement prevents rotation of the nut 64 as the bolt 41 is "tightened." As will be understood, only a slight initial offset is required, as the offset will become greater as the joint is subjected to increasing tightening forces, such that the nut 64 will become more securely gripped as soon as a slight tightening force is applied to the joint.

Figure 12:
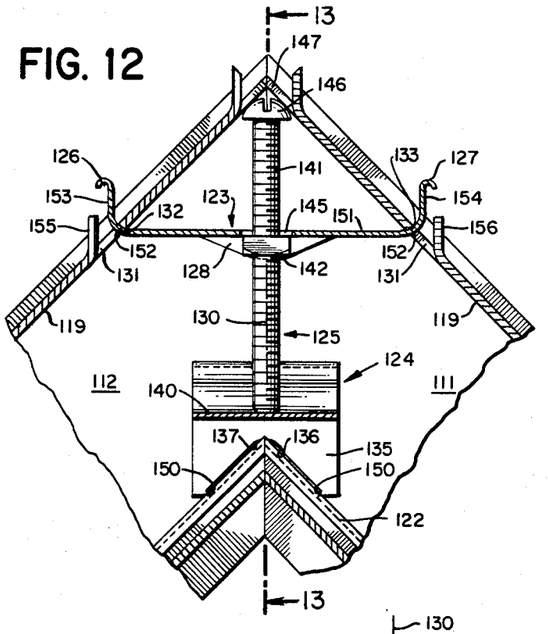
FIG. 12 is a cross-sectional view, as taken generally along line 12—12 of FIG. 13, of a further and particularly advantageous modification of the corner fastening assembly of the invention.
Figure 13:
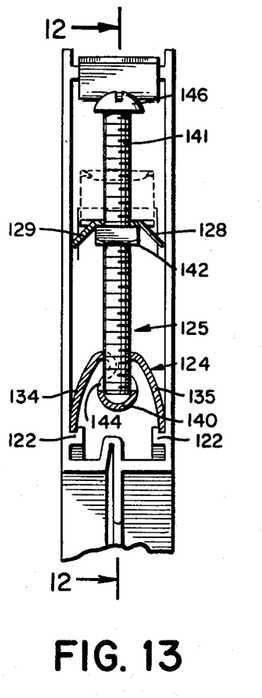
FIG. 13 is a cross-sectional view taken generally along line 13—13 of FIG. 12.
Figure 14:
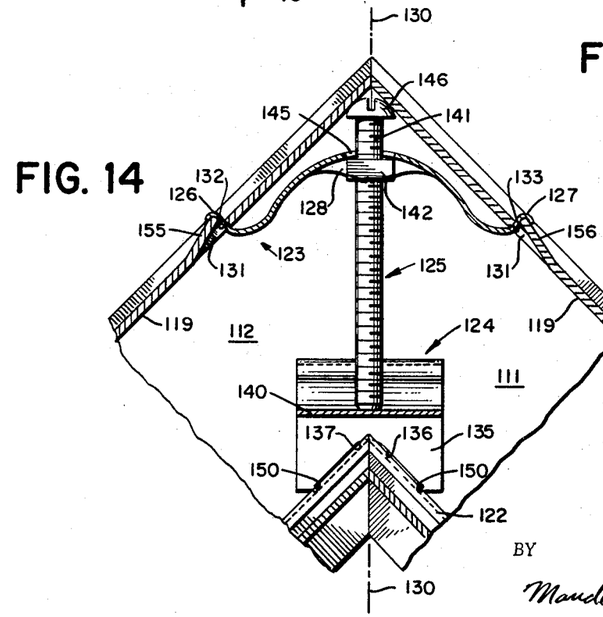
FIG. 14 is a fragmentary, cross-sectional view, similar to FIG. 12, showing the corner fastening assembly of FIG. 12 in a fully tightened condition.

A particularly advantageous form of the invention, shown in FIGS. 12–14, is constructed and arranged to provide at least eighteen separate points of pressure application to the connected joints, in addition to two points of interlock, such that the completed, tightened joint is extremely strong, durable, and precisely aligned. In the FIG. 12–14 modification, the compression element 124, advantageously of stamped-out formation from materials such as 19 gauge No. 302 spring temper stainless steel, is shaped to provide a pair of pressure legs 134, 135 and a troughlike center section 140. Overall, the compression element 124 has a generally M-shaped cross-sectional configuration substantially as described in connection with the modification of FIGS. 2–6.

In the specific illustration of FIGS. 12–14, the corner fastening assembly incorporates an actuating member 125 in the form of a stove bolt or the like 141 cooperating with a conventional nut 142 and having its bolthead 146 disposed adjacent and just inside the outside corner extremity of a mitered corner joint formed by butted rails 111, 112. Accordingly, the compression element 124 is provided with appropriate arcuate cut-outs 144 arranged to receive closely and to guide and support the lower end portion of the bolt 141. The lower end extremity of the bolt bears against the bottom of the trough-like center portion 140 of the compression element, as shown in FIG. 13.

In accordance with specific aspects of the invention, the pressure legs 134, 135 of the compression element are shaped and constructed to provide sharp points 150 adjacent the inner end extremities of the compression element. In a typical corner fastening assembly according to the invention, the points 150, which may be descriptively referred to as "pressure barbs," may have a depth on the order of about $30/1000$ inch, for example (as for use in connection with aluminum frame sections), and they advantageously may be located 1/8 inch or so inward from the side extremities of the compression element, enabling significant pressure to be brought to bear on the barbs. As shown in FIGS. 12 and 13, the pressure barbs 150 are arranged to act upon internal ribs 122 of the frame sections, which may advantageously be provided with longitudinal recesses for reception of the pressure legs.

As another specific aspect of the invention, the compression element 124 of the FIG. 12–14 modification is so formed that inverted V-shaped notches 136 formed in the pressure legs thereof are formed with generously rounded apex regions 137 and with side edges which advantageously may be generally parallel to the ribs 122. In a typical practical embodiment for connection of the frame sections of a conventional storm or screen door, for example, the compression element 124 may have a width on the order of 1.375 inches, and the V-shaped notches 137 therein may have a total depth of about 0.500 inch, in which event the rounded apex area 137 might typically have a radius on the order of 0.187 inch.

When the compression element 124 as above described is applied to a mitered corner joint as shown in FIG. 12, the pressure barbs 150 are brought to bear against the ribs 122 at points spaced away from the miter axis, and serve to apply desirable compressive forces to the respective frame sections 111, 112, urging the frame sections toward the miter axis and into firm contact with each other. In addition, the pressure barbs bite into the relatively soft aluminum material of the frame section to provide a positive securing action. At the same time, in the region where the generously rounded notch apex passes over the sharp apex of the corner joint between the ribs 122 of the respective frame sections, the metal material of the compression element 124 tends to bite into the softer aluminum material of the apex extremity, as will be understood. In the installed and tightened condition of the joint, the rounded apex area 137 applies advantageous lateral compression forces to the ribs 122, in the immediate region of the apex thereof, urging the respective ribs tightly into compression at the miter joint. In addition, by biting into the metal itself in this region, the compression element 124 has a desirable locking action against twisting and other distorting forces applied to the secure frame sections.

The modification of FIGS. 12–14 also incorporates a novel and advantageous modified form of tension element 123, which may be of stamped-out formation, from material such as 23 gauge No. 302 spring temper stainless steel, for example, shaped to provide lateral pressure tabs 128, 129 in the center region of the tension element, the pressure tabs being arranged to span the miter axis 130 and to confine the nut 142 against rotation. The element also is provided with a central opening 145 for the reception of the shank portion of the actuating bolt 141.

As shown in FIG. 12, the modified tension element 123 is provided with an initially relatively flat central body portion 151 joined by curves 152 of generous radius to a pair of upstanding arm sections 153, 154. At the upper extremity of each of the arm portions there is provided a downwardly opening hook 126, 127. In a device of standard proportions, the upstanding arms 153, 154 may be separated by a distance on the order of 3 inches, the radius of the curves 152 may be on the order of .156 inch, and the hook portions 126, 127 may have a radius on the order of 0.078 inch.

For installation of the corner fastening device of FIGS. 12–14, the outer walls 119 of the respective frame sections are provided with openings 131 formed by staked-out tabs 155, 156. For an assembly utilizing a three-inch tension element, as described in the preceding paragraph, the staked-out tabs are so disposed in the frame walls 119 as to provide locking edges 132, 133 located about 2 inches out from the miter axis, measured parallel with the wall. The tabs 155, 156 themselves may be about ½ inch in length, staked-out to have their ends lying generally parallel to the miter axis, as shown in FIG. 12.

Advantageously, the corner extremities of the walls 119 are also staked-out to form an access opening 147 to the bolthead 146, which can easily be closed after securing and tightening of the joint to conceal the fastening and prevent unauthorized tampering therewith.

To assemble the corner joint of FIGS. 12–14, the fastener assembly comprising the tension and compression elements 123, 124 and the actuating element 125 are loosely assembled within the interior of the hollow frame sections 111, 112 in the manner indicated in FIG. 12, and the frame sections are initially prepositioned in substantially butted relationship. Thereafter, the bolt 141 is tightened by clockwise rotation, causing the nut 142 to advance away from the compression element 124 and impart a bowed bolt configuration to the element 123 and place it under tension.

As the nut 142 advances in an upward direction, as viewed in FIG. 12, the central portions of the tension element are bowed upward and this serves to draw the curved portions 152 inward around the locking edges 132, 133. This in turn causes the downwardly opening hooks 126, 127 to be urged outward generally over the tops of the tabs 155, 156, ultimately causing the tab edges to be lockingly engaged by the hooks 126, 127. Continued tightening of the joint, by clockwise rotation of the bolt 141, causes the hooks 126, 127 to draw the tabs 155, 156 closed, up to the point where the presence of the tension element strip material, between the tab edges and the locking edges 132, 133, interferes with further closing movement of the tabs. At this point, the ends of the tension element 123 are securely locked by the walls 119 of the frame sections.

The arrangement of the tension element 123 and the tab elements 155, 156 of the FIGS. 12–14 embodiment is particularly advantageous, in that it accommodates swift and efficient initial assembly of the fastening elements, through the provision of initially large openings 131 in the frame section walls, yet provides for automatic closure of the openings as tension is applied to the joint. As in the case of the previously described embodiments, of course, the corner fastening arrangement of FIGS. 12–14 serves to securely align and support the frame sections 111, 112 by the outward pressure of the lateral tabs 128, 129 and of the pressure legs 134, 135 against the front and rear walls of the frame sections and in spanning relation to the miter axis. These advantageous forces are, of course, in addition to the principal tension and compression forces which draw the frame sections tightly toward each other at the miter.

Figure 15:
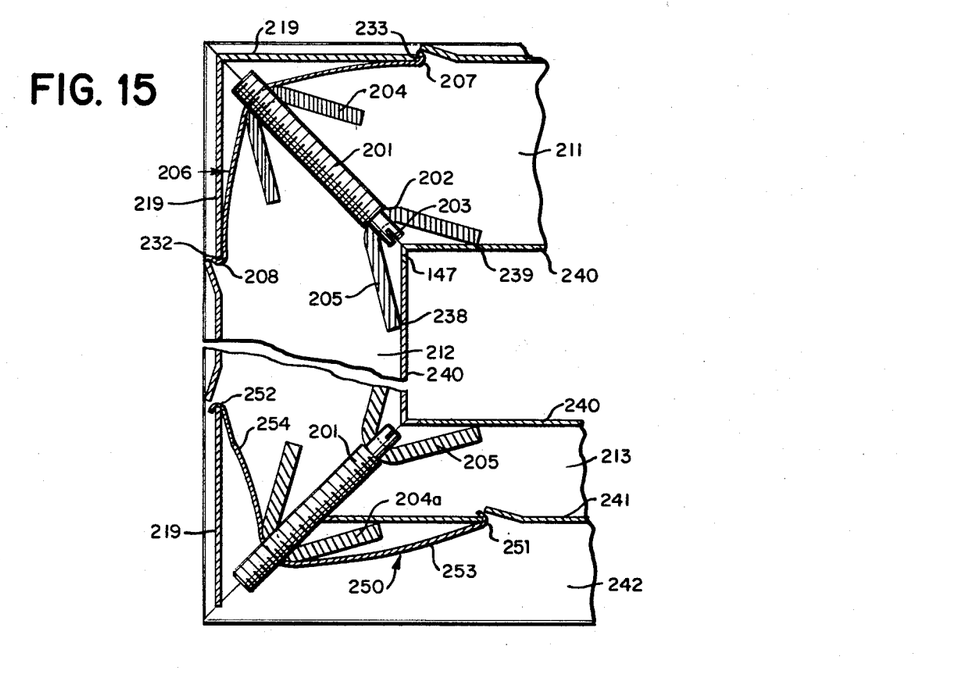
FIG. 15 is a cross-sectional view illustrating further modified forms of the corner fastening assembly of the invention.
Figure 16:
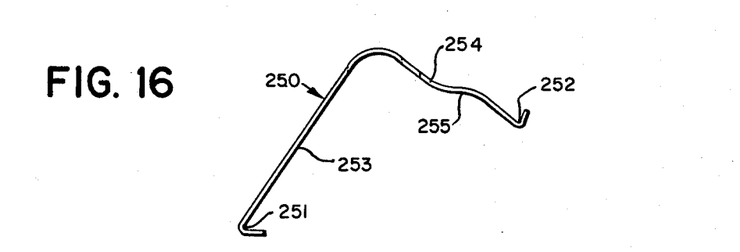
FIGS. 16 and 17 are elevational and plan views, respectively, of a tension element advantageously utilized in connection with one of the modified corner fastening assemblies of FIG. 15.
Figure 17:
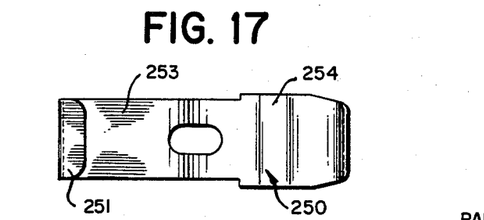

The modification of FIGS. 15–17 utilizes an adjusting screw 201 which is threaded over most of its length but is provided near its inner end with a shoulder 202 and a slotted extension 203 of reduced diameter. The threaded portion of the screw receives a first pressure plate 204, which may be described for convenience as being of generally inverted U-shaped cross-sectional configuration. A second pressure plate 205 of similar configuration is received over the slotted extension 203 and bears against the shoulder 202. The pressure plates 204, 205 may advantageously be cut from the same cross-section, differing in that the first-named pressure plate 204 has a larger threaded bore for the reception of the threaded part of the screw 201, while the second-named pressure plate 205 has a smaller bore, without threads, to receive the extension 203.

As shown in FIG. 15, the rounded outer portion of the first pressure plate 204 is arranged to support the center section of a tension element 206 advantageously of a spring temper strip material having hooks 207, 208 at its extremities arranged to be received over locking edges 232, 233 of the outer walls 219 of frame sections 211, 212.

The second or inner pressure plate 205 is meant to have an included angle somewhat less than 90° and has a pair of pressure edges 238, 239 arranged to bear upon the inner walls 240 of the frame section. An opening 147 is provided at the inside corner extremity for screwdriver access to the slotted extension 203.

Advantageously, the front-to-back width dimension of the pressure plates 204, 205 is substantially equal to the corresponding interior dimension of the frame sections 211, 212, to afford a measure of lateral alignment and support to the respective frame sections, it being understood, however, that the illustrated pressure plates 204, 205 are not designated to apply resilient lateral pressure in the manner of the lateral pressure tabs and the pressure legs of the tension and compression elements of the embodiments of FIGS. 2–6 and 12–14, for example.

In the illustration of FIG. 15, the vertical frame section 212 is shown to be joined along a bottom corner miter joint by a modified frame section 213 of a type suitable as the bottom frame section of a storm door or screen door, for example. In this respect, the bottom frame section 213 is provided with a horizontal interior frame wall 241 and a bottom recess 242 arranged to receive an adjustable expander (not specifically illustrated). Thus, as will be evident in FIG. 15, the vertical and bottom frame sections 212, 213 meet along their front and back walls and along their inner walls 240. However, the outer wall 219 of the vertical section 212 does not meet with the interior wall 241 of the bottom frame section 213.

To accommodate the miter joint securement of the dissimilar frame sections 212, 213, a tension element 250 of special design is provided, which includes an inside hook portion 251 for engagement with the interior wall 241 of the lower frame section 213, and an outside hook portion 252 for engagement with the outer wall 219 of the vertical frame section. One leg 253 of the tension element 250, which terminates in the inside hook 251, is of greater length than the corresponding leg 254 which terminates in the outside hook 252. This is advantageous because of the fact that the inward location of the interior wall 241 results in the application of tension forces thereto at a more acute angle to the miter axis than in the case of the tension forces applied to the vertical frame section 212, and this asymmetry is minimized in degree by increasing the length of the tension leg 253 relative to that of the tenson leg 254. As a means of equalizing the relative resiliencies of the tension legs 253, 254 in the installed condition of the corner fastening assembly, the tension leg 254 may be provided with one or more reverse bends, as at 255 in FIG. 16.

Installation of the lower corner fastening element and its functioning is the same as that described in connection with the upper corner fastening element of FIG. 15, the principal parts of the fastener including, in addition to the modified tension element 250, pressure plates 204a and 205 and a shouldered adjusting screw 201.

As shown in FIG. 17, the leg 253 of the tension spring 250 is of narrower dimensions than the leg 254, to accommodate the presence of an adjustable expander (not shown) of inverted U-shaped cross-section, for example, having its upwardly extending walls received in straddling relation to the spring leg 253, within the recess 242. In a similar manner, the righthand portion, at least, of the pressure plate 204a should be of reduced width to accommodate the adjustable expander.

Figures 18, 20:
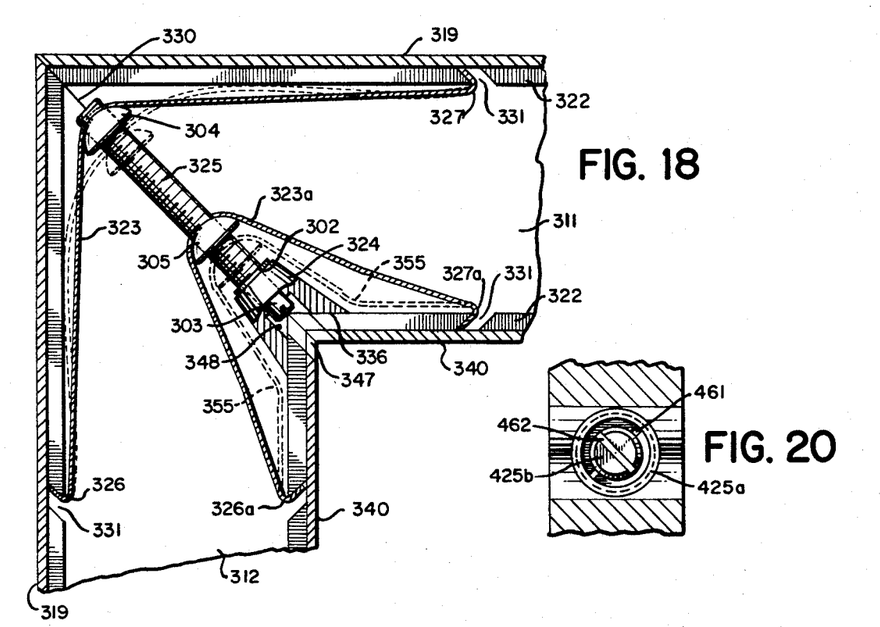
FIG. 18 is a cross-sectional view of a further modified form of the corner fastening assembly of the invention.
FIG. 20 is an enlarged, fragmentary, cross-sectional view taken generally along line 20—20 of FIG. 19.
Figure 19:
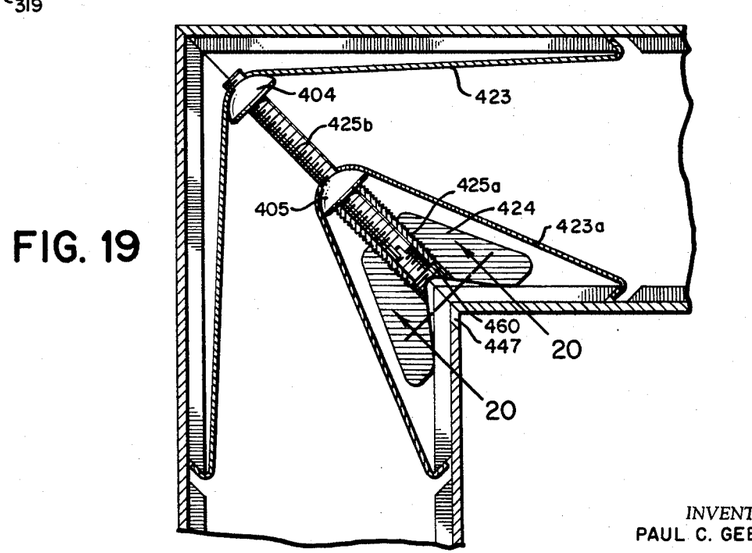
FIG. 19 is a cross-sectional view of a still further modified form of corner fastening assembly of the invention.

In the modifications of FIGS. 18–20, means are provided, in addition to the principal tension, compression, and adjusting elements of the corner fastening assembly, for applying forces of tension to the inside corner walls of the frame sections, to enhance the securing action of the fastener along the inside corner, as may be desirable in certain instances. In the modification of FIG. 18, a single adjusting element simultaneously applies all of the requisite forces to the miter joint, whereas in the modification of FIGS. 19 and 20, separate adjustment means are provided for the inside and outside corners.

Referring initially to FIG. 18, mitered frame sections 311, 312, butted along a miter axis 330, advantageously are provided along their inner and outer walls 340 and 319, respectively, with longitudinal ribs 322 notched at 331 at points spaced outward of the miter axis. The corner fastening assembly of the FIG. 18 modification comprises a threaded adjusting element 325 having a shoulder 302 arranged to be seated against the outer face of a compression element 324. A slotted extension 303 of the adjusting element extends through an appropriate bore in the compression element 324 and is exposed in an enlarged recess 348 and appropriate openings 347 in the inside walls of the frame sections. The compression element 324 is notched out at 336, at an included angle of 90° or less, so as to engage and apply compressive force to the inside walls of the frame sections across the mitered joint.

At spaced points along the threaded adjusting element 325 are located internally threaded pressure plates 304, 305 arranged to support the apertured center portions of a pair of outer and inner tension elements 323 and 323a. Advantageously, each of the tension elements is formed of a sheet material having spring characteristics, and the elements are provided at each end with a suitable hook for engagement with walls of the frame sections. The outer tension element 323 has outwardly turned hooks 326, 327 for interlocking reception in the slotted openings 331 in the outer wall ribs 322, while the inner tension element 323a is provided with inwardly turned hooks 326a, 327a similarly arranged for interlocking reception in the slotted openings 331 in the inner wall ribs.

In the operation of the modification of FIG. 18, the outer tension element 323, the compression element 324, and the adjusting element 325 function in a usual manner as previously described herein. In addition, upon rotary manipulation of the adjusting element 325 to advance the pressure plate 304, the inner pressure plate 305 is simultaneously advanced through a similar distance, applying tension to the inner tension element 323a. This action serves to drive the inner wall areas 340 of the frame sections tightly into the V-shaped notch 336 of the compression member 324 to supplement the action of the compression element.

Advantageously, inasmuch as the function of the tension element 323a is secondary, relative to that of the outer tension element 323, the inner tension element is provided with bends 355, in the relaxed condition of the inner tension element as illustrated in broken lines, tending to impart somewhat greater resilience to the inner tension element than is provided in the outer tension element. This arrangement assures against failing to apply full closing tension to the outer tension element 323 by reason of premature overtensioning of the inner tension element 323a.

Advantageously, the front-to-back width dimensions of the pressure plates 304, 305 and of the compression element 324 are substantially equal to the interior dimensions of the frame sections 311, 312, such that the last-named elements, disposed in spanning relation to the miter axis 330, assist in aligning and supporting the frame sections.

In the modification of FIGS. 19 and 20, the compression element 424 is provided with internal threads 460 engaging a threaded adjusting tube 425a. The tube 425a, in addition to being externally threaded for engagement with the internal threads 460, is threaded internally for engagement with a threaded adjusting rod 425b.

As illustrated, the adjusting tube 425a is slotted at 461, and the threaded rod 425b is slotted at 462. Further, the threaded rod advantageously is recessed within the tube 425a, such that both of the adjusting elements 425a, 425b are separately and independently accessible for screwdriver adjustment, through an inside corner opening 447 in the frame sections.

In accordance with the modification of FIGS. 19, 20, a first pressure plate 404 is threadedly engaged with the adjusting rod 425b and supports an outer tension element 423. An inner pressure plate 405 is loosely received over the threaded rod 425b and is supported by the end of the threaded tube 425a. The pressure plate 405 supports an inner tension element 423a, whose function is similar to the inner tension element 323a of the FIG. 18 modification, except that it need not be provided with bends 355 for added resilience, by reason of the separate adjustment facility.

Operation of the modification of FIGS. 19 and 20 is substantially the same as that of FIG. 18, except that tension in the elements 423, 423a is separately adjustable, by separate screwdriver adjustment of the elements 425a, 425b.

As will be appreciated from all of the foregoing, the corner fastening arrangement of the invention is susceptible of a wide variety of desirable variations, depending upon particular end utilizations desired. In each instance, the fastening assembly is characterized by the ease and simplicity of installation, extraordinary effectiveness in its ability to secure the joint, and an economy of manufacture. The various modifications of FIGS. 1–15 are particularly advantageous in respect of their ability to apply a resilient aligning and securing force not only across the miter but in the plane of the miter, at right angles to the plane of the connected frame sections. These modifications serve to apply aligning and securing forces and pressures at as many as twenty separate points at a single corner assembly, assuring precision alignment of the joint as assembled and continued security and alignment of the joint throughout extended periods of use. All of the various modifications, of course, provide for subsequent retightening of the joint from time to time, as may prove necessary occasionally where the parent metal of the frame sections themselves becomes deformed from severe use or otherwise.

A particularly advantageous form of the invention is that illustrated in FIGS. 12–14. The modification referred to represents a relative ultimate in simplicity of its component parts and economy of manufacture, utilizing two relatively simplified stampings and a readily available conventional stove bolt and nut. At the same time, security and alignment of the joint are assured by the application of pressures at an extraordinarily large number of separate points.

It should be understood, of course, that the specific forms of the invention herein illustrated and described are intended to be representative only, as certain changes may be made therein without departing from the clear teachings of the disclosure. By way of example only and not of limitation, while the fastener assemblies of the invention have been illustrated herein only in connection with mitered corner joints, many of the illustrated inventive principles are applicable to the securing of mullion joints and the like. Accordingly, reference should be made to the following appended claims in determining the full scope of the invention.

I claim:

1. A corner fastening assembly for connecting tubular frame sections at an angle joint, which comprises
   (a) a tension element having means for engaging each of two frame sections to be joined, across the outside corner of the angle joint,
   (b) a compression element having means for engaging each of said frame sections across the inside corner of the joint,
   (c) an actuating element connecting said tension and compression elements and operative to place them respectively under tension and compression, and
   (d) deformable pressure means on at least one of said tension and compression elements,
   (e) said deformable pressure means including a spring-like member positioned to span the joint between said frame sections at a location intermediate said inside and outside corners,
   (f) said spring-like member being displaceable and distortable to press outwardly against front or back wall areas of said frame sections, in response to the application of tension and compression forces to said tension and compression elements by said actuating element.

2. A corner fastening assembly according to claim 1, further characterized by
   (a) said tension element being formed of spring-like sheet metal and having hook-like portions adjacent its ends for engagement with outer wall portions of the frame sections, on opposite sides of the angle joint,
   (b) said tension element being actuated to a bowed condition to effect tensioning thereof,
   (c) said spring-like member comprising at least one pressure tab disposed laterally along an edge portion of said tension element and bent out of the principal surface contour thereof,
   (d) said pressure tab being urged to return toward the principal surface contour of the tension element upon the bowing thereof, whereby to apply lateral outward pressure to said front or back wall portions in spanning relation to said joint.

3. A corner fastening assembly according to claim 2, further characterized by
   (a) said deformable pressure means comprising a pair of pressure tabs extending in spaced relation along opposite lateral edges of said tension element and bent out of the principal surface contour thereof and toward the inside corner of the angle joint,
   (b) said actuating element comprising a rotatably actuated bolt and nut combination, at least one member of which has a polygonal configuration and is positioned between said pressure tabs,
   (c) said one member being non-rotatively held by and between said pressure tabs,
   (d) whereby said pressure tabs simultaneously urge said front and back wall areas outward in response to actuation of said actuation member while preventing said one member from rotating.

4. For use in a corner fastening assembly for joining a pair of generally hollow frame sections at a corner joint and of the type including tension and compression securing elements spanning the joint and engaging the respective frame sections, and an actuating element connecting the compression and tension elements, an improved securing element characterized by said securing element comprising
   (a) means for engaging the frame sections on opposite sides of the joint axis and for urging the respective frame sections toward the joint axis, and
   (b) resiliently actuated pressure means spanning said miter axis and acting against front and back surfaces of said frame sections, (c) said resiliently actuated pressure means including a member being displaceable against said front and back surfaces in accordance with and in response to the forces applied by said securing element to urge said frame sections toward said joint axis.

5. The securing element of claim 4, for use in combination with a bolt-and-nut actuating element, further characterized by
   (a) said securing element comprising a tension element formed of strip material and having means at its ends for engaging frame sections and means intermediate its ends for receiving said actuating element,
   (b) said receiving means comprising a pair of laterally disposed, spaced, strip-like sections partially severed from the body of the tension element and deformed out of the principal surface contours thereof,
   (c) a polygonal portion of said actuator being nonrotatively received between said spaced strip-like sections.

6. The securing element of claim 4 in combination with a pair of frame sections and further characterized by
   (a) said securing element comprising a tension element formed of strip material and having means at its ends for engaging frame sections and means intermediate its ends for receiving said actuating element,
   (b) said means for engaging the frame sections comprising a pair of hook-like bends in said strip material,
   (c) said frame sections being formed with outer wall openings formed by staked-out tabs projecting toward the joint axis,
   (d) said hook-like bends being formed at opposite ends of said tension element and being oriented for engagement with the free ends of said tabs,
   (e) said tabs being drawn to a substantially closed position upon the application of substantial tension to said tension element, whereby the end portions of said element are interlockingly engaged between the free edges of the substantially closed tabs and the opposing wall edges of the frame sections.

7. The securing element of claim 4, further characterized by
   (a) said securing element comprising a compression element formed of spring-like strip material and having a generally M-shaped cross-sectional configuration including resilient pressure legs and a troughlike portion connecting said pressure legs, adapted to straddle and apply compressive pressure to inside corner walls of frame sections,
   (c) said pressure legs being resiliently deformable in a separating direction by pressure applied to the compression element toward said inside corner.

8. The compression element of claim 7, further characterized by
   (a) said pressure legs having notched-out recesses of generally inverted V-shaped configuration,
   (b) said recesses being generously rounded adjacent their apices and provided with pointed pressure barbs adjacent their extremities, for multiple-point locking pressure contact with frame sections in the region of the inside corner of the joint.

9. The compression element of claim 7, further characterized by
   (a) said troughlike portion being of a cross-sectional size and shape to receive and support the rounded head of a stove bolt-like actuating element, and
   (b) said troughlike portion having an opening therein for locating said rounded head and providing screwdriver access thereto.

10. The compression element of claim 7, further characterized by
    (a) said troughlike portion being provided with recess means for the reception, location and support of one end of a stove bolt-like actuating element.

11. The compression element of claim 7, further characterized by
    (a) said troughlike portion being defined in part by upwardly and inwardly extending walls restricting access to the top of the trough,
    (b) said walls being resiliently separable to accommodate the entry of a stove bolt-like actuating element disposed generally at right angles to the axis of the trough.

12. The compression element of claim 11, further characterized by
    (a) said upwardly and inwardly extending walls having recess means formed therein for the reception and support of the shank portion of a stove bolt-like actuating element.

13. In a corner joint assembly for a storm door or the like, for joining at an angle a pair of generally hollow frame sections having generally butted inner walls, and comprising tension and compression elements spanning the joint axis and engaging the respective frame sections, and actuating means for applying tension and compression forces to the respective tension and compression elements, the improvement in said compression element characterized by
    (a) said compression element being formed of sheet metal-like material and having a pair of spaced pressure legs,
    (b) said pressure legs having their edge extremities directed toward the inside corner of said joint and having notched-out end edge portions positioned in straddling relation to the joint axis and arranged to engage and apply compressive pressures to the inside corner walls of said frame sections,
    (c) said inside walls being adapted to form a sharply angular apex at said joint axis, and
    (d) the notched-out portions of said pressure legs being generously rounded at their apices, whereby the sheet metal-like material of said compressive element, in the region of said rounded apices, is caused to bite into the sharply angular apex formed by said inner walls, to lock said inner walls against lateral displacement in the plane of the joint.

14. A corner fastening assembly for connecting tubular frame sections at an angle joint, which comprises
    (a) a tension element having means for engaging each of two frame sections to be joined, across the outside corner of the angle joint,
    (b) a compression element having means for engaging each of said frame sections across the inside corner of the joint,
    (c) said compression element being formed of spring-like sheet material and being shaped to have an M-like cross-sectional configuration including a pair of spaced, depending spring-like pressure legs and a troughlike intermediate portion,
    (d) said pressure legs positioned to span the joint between said frame sections at a location intermediate said inside and outside corners and formed to provide notches of inverted V-shaped general configuration arranged to be received in straddling relation to walls of said frame sections forming the inside corner of said angle joint,
    (e) an actuating element connecting said tension and compression elements and operative to place them respectively under tension and compression,
    (f) said actuating element being received in and bearing against said troughlike portion to urge said compression element toward the inside corner of said angle joint,
    (g) whereby said pressure legs are displaceable and distortable to press outwardly against front or back wall areas of said frame section, in response to the application of tension and compression forces to said tension and compression elements by said actuating element.

15. A corner fastening assembly according to claim 14, further characterized by
    (a) the troughlike portion of said compression element having opposed recess means for the reception, guidance, and support of an actuating bolt.

16. A corner fastening assembly according to claim 15, further characterized by
    (a) said compression element being so initially shaped and formed that the side wall portions of said troughlike portion must be resiliently separated to accommodate reception of said actuating bolt,
    (b) said actuating bolt thereafter being resiliently gripped and supported in predetermined relation to said compression element.

17. For use in a corner fastening assembly for joining a pair of generally hollow frame sections at a corner joint and of the type including tension and compression securing elements spanning the joint and engaging the respective frame sections, and an actuating element connecting the compression and tension elements, an improved securing element characterized by said securing element comprising
    (a) a tension element formed of strip material and having means at its ends of engaging frame sections and means intermediate its ends for receiving said actuating element,
    (b) said means for engaging the frame sections comprising first and second pairs of hook-like bends in said strip material,
    (c) said tension element being adapted for engagement with frame sections provided with outer wall openings formed by staked-out tabs projecting toward the joint axis,
    (d) a first pair of hook-like bends at opposite ends of the tension element being oriented to be engageable with outwardly facing wall edges of said openings,
    (e) the second pair of hook-like bends being adjacent and outside of said first pair and being oriented to be engageable with the end edges of said tabs,
    (f) resiliently actuated pressure means spanning said miter axis and acting against front and back surfaces of said frame sections,
    (g) said resiliently actuated pressure means including a distortable spring like member displaceable against said front and back surfaces being in accordance with and in response to the forces applied by said securing element to urge said frame sections toward said joint axis.

References Cited

UNITED STATES PATENTS

| | | |
|---|---|---|
| 1,246,714 | 11/1917 | Carlson. |
| 1,596,946 | 8/1926 | Ranney. |
| 2,776,735 | 1/1957 | Bancroft. |
| 2,994,414 | 8/1961 | Gebhard. |
| 2,996,159 | 8/1961 | Casebolt. |

FOREIGN PATENTS

| | | |
|---|---|---|
| 214,579 | 5/1941 | Switzerland. |

EDWARD C. ALLEN, *Primary Examiner.*

CARL W. TOMLIN, *Examiner.*

R. S. BRITTS, *Assistant Examiner.*

UNITED STATES PATENT OFFICE
CERTIFICATE OF CORRECTION

Patent No. 3,388,936

June 18, 1968

Paul C. Gebhard

It is certified that error appears in the above identified patent and that said Letters Patent are hereby corrected as shown below:

Column 2, line 43, "assemly" should read -- assembly --; line 60, "manuafacture" should read -- manufacture --. Column 4, line 40, "26, 26" should read -- 26, 27 --. Column 7, line 50, "resonable" should read -- reasonable --. Column 10, line 36, cancel "bolt". Column 11, line 31, "designated" should read -- designed --; line 64, "tenson" should read -- tension --. Column 15, line 50, after "legs," insert -- (b) said pressure legs having notched-out portions --. Column 17, line 26, "of" should read -- for --.

Signed and sealed this 30th day of December 1969.

(SEAL)
Attest:

Edward M. Fletcher, Jr.
Attesting Officer

WILLIAM E. SCHUYLER, JR.
Commissioner of Patents